(12) United States Patent
Lin et al.

(10) Patent No.: US 9,032,535 B2
(45) Date of Patent: May 12, 2015

(54) STORAGE DEVICE AND METHOD FOR PROVIDING A SCALABLE CONTENT PROTECTION SYSTEM

(75) Inventors: Jason T. Lin, Los Gatos, CA (US); Ron Barzilai, Cupertino, CA (US)

(73) Assignee: SanDisk Technologies Inc., Plano, TX (US)

( * ) Notice: Subject to any disclaimer, the term of this patent is extended or adjusted under 35 U.S.C. 154(b) by 314 days.

(21) Appl. No.: 12/651,153

(22) Filed: Dec. 31, 2009

(65) Prior Publication Data

US 2011/0162075 A1 Jun. 30, 2011

(51) Int. Cl.
| G06F 21/00 | (2013.01) |
| G06F 21/10 | (2013.01) |
| G06F 21/79 | (2013.01) |
| G11B 20/00 | (2006.01) |

(Continued)

(52) U.S. Cl.
CPC ............... *G06F 21/10* (2013.01); *G06F 21/79* (2013.01); *G06F 2221/0728* (2013.01); *G06F 2221/0742* (2013.01); *G06F 2221/0744* (2013.01); *G11B 20/00086* (2013.01); *G11B 20/0021* (2013.01); *G11B 20/00253* (2013.01); *G11B 20/1262* (2013.01); *G11B 2220/61* (2013.01); *H04N 5/907* (2013.01); *H04N 5/913* (2013.01); *H04N 7/1675* (2013.01); *H04N 9/8042* (2013.01); *H04N 21/2541* (2013.01); *H04N 21/4147* (2013.01); *H04N 21/4184* (2013.01); *H04N 21/4367* (2013.01); *H04N 21/44029* (2013.01); *H04N 21/835* (2013.01); *H04N 2005/91364* (2013.01)

(58) Field of Classification Search
CPC ....................................................... G06F 21/10
USPC .......................................................... 726/26
See application file for complete search history.

(56) References Cited

U.S. PATENT DOCUMENTS

| 5,263,158 A | 11/1993 | Janis |
| 6,748,531 B1 * | 6/2004 | Epstein .......................... 713/158 |

(Continued)

FOREIGN PATENT DOCUMENTS

| CN | 1535014 | 10/2004 |
| CN | 101120349 | 2/2008 |

(Continued)

OTHER PUBLICATIONS

International Search Report and Written Opinion for PCT/US2010/056650, dated Mar. 9, 2011, 13 pages.

(Continued)

*Primary Examiner* — Jason K Gee
(74) *Attorney, Agent, or Firm* — Brinks Gilson & Lione

(57) ABSTRACT

A storage device and method for providing a scalable content protection system are disclosed. In one embodiment, a storage device is provided comprising a memory operative to store a plurality of versions of content, wherein each version of the content is of a different quality and is associated with a different level of content protection. The storage device receives information from the host identifying a level of content protection supported by the host. The storage device sends, to the host, a version of the content that is associated with the level of content protection supported by the host, wherein the version of the content is sent to the host using the level of content protection that is supported by the host. In another embodiment, different levels of content protection are applied to different types of content.

12 Claims, 8 Drawing Sheets

(51) Int. Cl.
*G11B 20/12* (2006.01)
*H04N 5/913* (2006.01)
*H04N 7/167* (2011.01)
*H04N 9/804* (2006.01)
*H04N 21/254* (2011.01)
*H04N 21/4147* (2011.01)
*H04N 21/418* (2011.01)
*H04N 21/4367* (2011.01)
*H04N 21/4402* (2011.01)
*H04N 21/835* (2011.01)
*H04N 5/907* (2006.01)

(56) References Cited

U.S. PATENT DOCUMENTS

| | | |
|---|---|---|
| 7,010,681 B1 | 3/2006 | Fletcher et al. |
| 2004/0153171 A1 | 8/2004 | Brandt et al. |
| 2004/0196972 A1 | 10/2004 | Zhu et al. |
| 2005/0246526 A1* | 11/2005 | Forlenza et al. ............. 713/165 |
| 2005/0289508 A1 | 12/2005 | Illowsky et al. |
| 2006/0090082 A1* | 4/2006 | Apostolopoulos ............ 713/189 |
| 2006/0174137 A1 | 8/2006 | Carr |
| 2006/0174334 A1* | 8/2006 | Perlin et al. ........................ 726/9 |
| 2007/0056042 A1 | 3/2007 | Qawami et al. |
| 2007/0143824 A1 | 6/2007 | Shahbazi |
| 2007/0180539 A1 | 8/2007 | Holtzman et al. |
| 2008/0133938 A1 | 6/2008 | Kocher et al. |
| 2009/0006796 A1 | 1/2009 | Chang et al. |
| 2009/0086978 A1* | 4/2009 | McAvoy et al. ............. 380/279 |

FOREIGN PATENT DOCUMENTS

| | | |
|---|---|---|
| WO | WO 2006/133059 | 12/2006 |
| WO | WO 2008/008244 A3 | 1/2008 |
| WO | WO 2009/037712 | 3/2009 |
| WO | WO 2009/142689 | 11/2009 |

OTHER PUBLICATIONS

Yu, H. et al., "Progressive and Scalable Encryption for Multimedia Content Access Control", *New Frontiers in Telecommunications: 2003 IEEE International Conference on Communications*, vol. 1, May 11, 2003, pp. 547-551.

English translation of Office Action for Chinese Patent Application Serial No. 201080060340.3 dated Jun. 24, 2014, 15 pages.

Office Action for European Patent Application Serial No. 10 782 755.2 dated Jun. 2, 2014, 5 pages.

* cited by examiner

STORAGE DEVICE AND METHOD FOR PROVIDING A SCALABLE CONTENT PROTECTION SYSTEM

BACKGROUND

Content storage devices, such as memory cards and memory sticks, typically use a single, fixed content protection scheme that is independent of both the content stored in the storage device and the crypto (i.e., encryption/decryption) and other capabilities of the host. Accordingly, all host devices accessing the content must have the same capabilities irrespective of the value or quality of the content. This means, for example, that a mobile phone must have the same security capability as a set-top box in order to access the content, which can add cost to the mobile phone and slow market adoption of the storage device as a source of content. The use of a single, fixed content protection scheme can also create a dilemma in environments where one would like the content to be accessible to a multitude of different types of hosts. For example, to ensure that all hosts will be able to access the content, the content can be protected using a "least common denominator" content protection scheme. However, this may result in a lowered level of security, which may not be acceptable to some content owners. On the other hand, if content is protected using a "highest common denominator" content protection scheme, the most demanding content owners would be satisfied, but some hosts (e.g., mobile devices) may not have the crypto capability, robustness, processing power, and/or performance to support that content protection scheme.

SUMMARY

Embodiments of the present invention are defined by the claims, and nothing in this section should be taken as a limitation on those claims.

By way of introduction, the embodiments described below generally relate to a storage device and method for providing a scalable content protection system. In one embodiment, a storage device is provided comprising a memory operative to store a plurality of versions of content, wherein each version of the content is of a different quality and is associated with a different level of content protection. The storage device receives information from the host identifying a level of content protection supported by the host. The storage device sends, to the host, a version of the content that is associated with the level of content protection supported by the host, wherein the version of the content is sent to the host using the level of content protection that is supported by the host. In another embodiment, different levels of content protection are applied to different types of content.

Other embodiments are provided, and each of the embodiments can be used alone or together in combination. Various embodiments will now be described with reference to the attached drawings.

DETAILED DESCRIPTION OF THE PRESENTLY PREFERRED EMBODIMENTS

By way of introduction, the following embodiments provide a storage device and method for providing a scalable content protection system. As mentioned in the background section above, physical media today typically uses a single content protection scheme independent of content value and host capability. This means, for example, that a mobile phone must have the same security capability as a set-top box in order to access the content, which can add cost to the mobile phone and slow market adoption of the storage device as a source of content. The following embodiments provide a solution to this problem by providing a storage device that has a scalable content protection system. The storage device stores a plurality of different-quality versions of content, wherein each version is associated with a different level of content protection. In operation, the storage device receives information from a host identifying a level of content protection supported by the host and provides the host with the appropriate version of the content using the level of content protection that is supported by the host.

Figure 1:
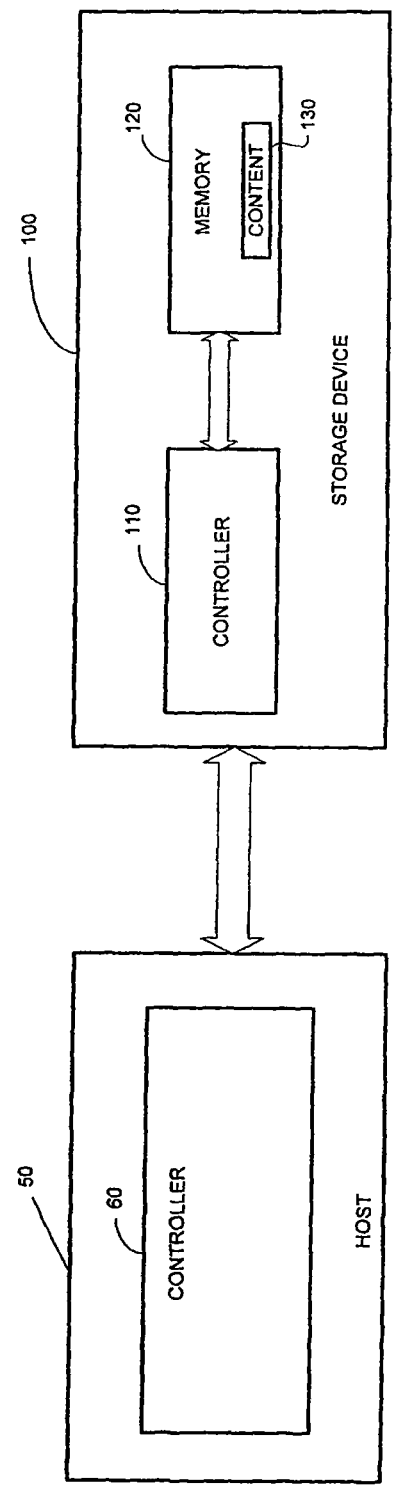
FIG. 1 is a block diagram of a host and a storage device of an embodiment.

Turning now to the drawings, FIG. 1 is a block diagram of a host 50 and a storage device 100 of an embodiment. As shown in FIG. 1, the storage device 100 comprises a controller 110 and a memory 120 operative to store a plurality of versions of content 130. "Content" can take any suitable form, such as but not limited to (2D or 3D) digital video (with or without accompanying audio) (e.g., a movie, an episode of a TV show, a news program, etc.), audio (e.g., a song, a podcast, one or a series of sounds, an audio book, etc.), still or moving images (e.g., a photograph, a computer-generated display, etc.), text (with or without graphics) (e.g., an article, a text file, etc.), a video game, and a hybrid multi-media presentation of two or more of these forms.

The controller 110 can be implemented in any suitable manner. For example, the controller 110 can take the form of a microprocessor or processor and a computer-readable medium that stores computer-readable program code (e.g., software or firmware) executable by the (micro)processor, logic gates, switches, an application specific integrated circuit (ASIC), a programmable logic controller, and an embedded microcontroller, for example. Examples of controllers include, but are not limited to, the following microcontrollers: ARC 625D, Atmel AT91 SAM, Microchip PIC18F26K20, and Silicon Labs C8051F320. Examples of various components that can be used in a controller are described in the embodiments discussed below and are shown in the associated drawings. The controller 110 can also be implemented as part of the memory 120 control logic.

The memory 120 can take any suitable form. In one embodiment, the memory 120 takes the form of a solid-state (e.g., flash) memory and can be one-time programmable, few-time programmable, or many-time programmable. However, other forms of memory, such as optical memory and magnetic memory, can be used. Although shown as single components in FIG. 1, the controller 110 and/or memory 120 can be implemented with several components. Further, the storage device 100 can contain other components, which are not shown in FIG. 1 to simplify the drawings. In one embodiment, the storage device 100 takes the form of a handheld, removable memory card; however, the storage device 100 can take other forms, such as, but not limited to, a solid-state drive and a universal serial bus (USB) device.

As shown in FIG. 1, the storage device 100 is in communication with the host device 50. As used herein, the phrase "in communication with" means directly in communication with or indirectly in communication with through one or more components, which may or may not be shown or described herein. The host 50 can take any suitable form, such as, but not limited to, a dedicated content player, a mobile phone, a personal computer, a game device, a personal digital assistant (PDA), and a TV system. Preferably, the storage device 100 is removably connected to the host 50, so a user can use the storage device 100 with a variety of hosts. The host 50 contains a controller 60 and can contain other components (e.g., a display device, a speaker, a headphone jack, a video output connection, etc.), which are not shown in FIG. 1 to simplify the drawings.

The storage device 100 of these embodiments can be implemented in any suitable manner. The following paragraphs and referenced drawings described one exemplary implementation. It should be understood that these embodiments are merely examples and that details shown and described herein should not be read into the claims unless explicitly recited therein.

Figure 2:
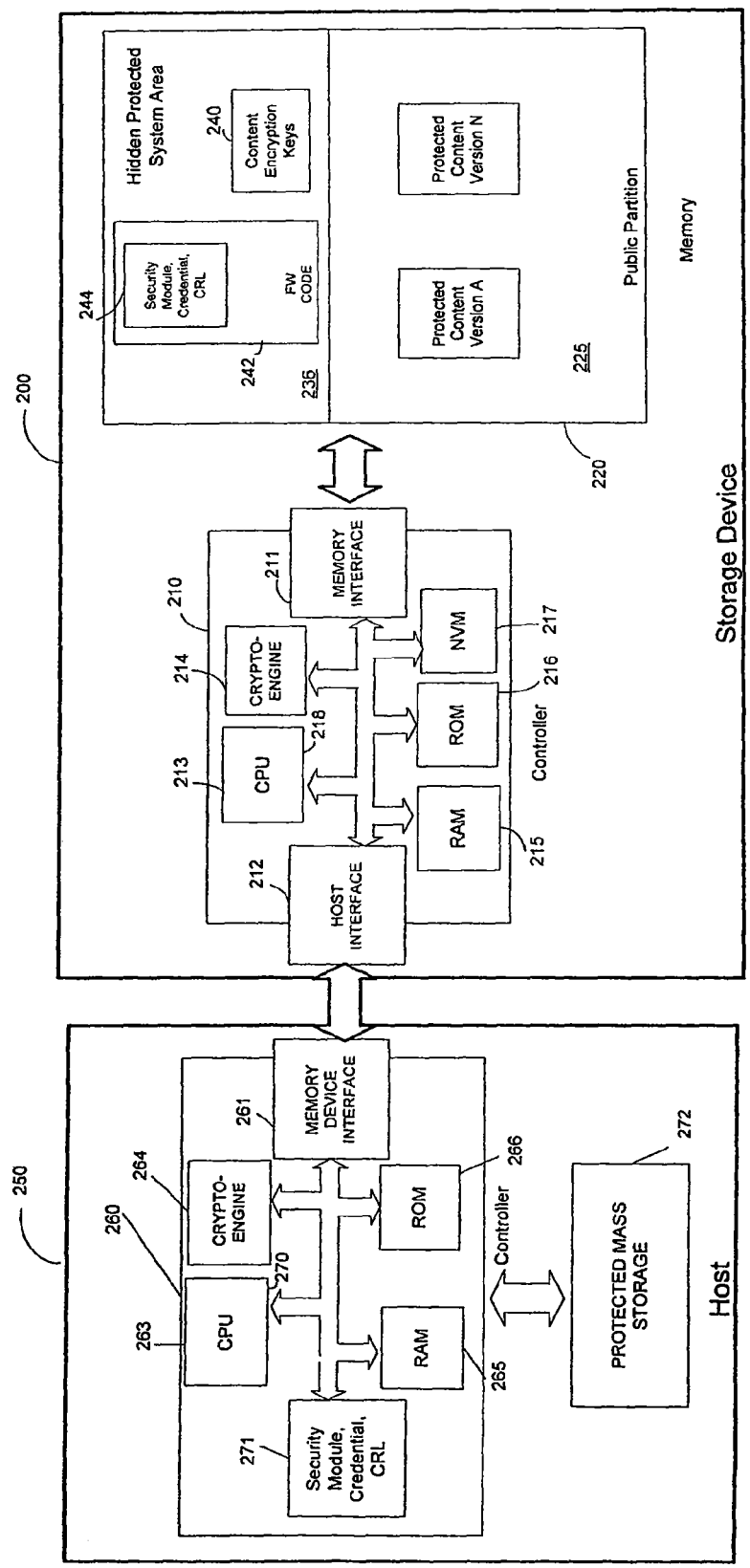
FIG. 2 is a block diagram of a host and a storage device of another embodiment.

FIG. 2 is a block diagram of a storage device 200 and host 250 of another embodiment. As shown in FIG. 2, the storage device 200 comprises a controller 210 and a memory 220. The controller 210 comprises a memory interface 211 for interfacing with the memory 220 and a host interface 212 for interfacing with the host 250. The controller 210 also comprises a central processing unit (CPU) 213, a hardware crypto-engine 214 operative to provide encryption and/or decryption operations, read access memory (RAM) 215, read only memory (ROM) 216 which can store firmware for the basic operations of the storage device 200, and a non-volatile memory (NVM) 217 which can store a device-specific key used for encryption/decryption operations (or an E-Fuse or other mechanism to store memory device credentials).

In this embodiment, the memory 220 comprises a public partition 225 that is managed by a file system on the host 250 and a hidden protected system area 235 that is internally managed by the controller 210. The hidden protected system area 235 stores content encryption keys (CEKs) 240 and firmware (FW) code 242, which can include a security module 244 containing, for example, credentials and certificate revocation lists (CRLs). The public partition 225 and the hidden protected system area 235 can be part of the same memory unit or can be different memory units. The hidden protected system area 235 is "hidden" because it is internally managed by the controller 210 (and not by the host controller 260) and is "protected" because objects stored in that area 235 are encrypted with the unique key stored in the non-volatile memory 217 of the controller 210 (or elsewhere in the storage device 200). Accordingly, to access objects stored in that area 235, the controller 210 would use the crypto-engine 214 and the key stored in the non-volatile memory 217 to decrypt the encrypted objects. Preferably, the storage device 200 takes the form of a TrustedFlash™ storage device by SanDisk Corporation.

In this embodiment, the public partition 225 of the memory 220 stores a plurality of versions of content, each of varying quality. (Alternatively, the plurality of versions of content can also be stored in the hidden partition. The host device with a separate file system mounts to this hidden partition after authentication to gain access.) For example, the versions of the content can be movies that differ in resolution or games that vary in features. While the public partition 225 of the memory 220 is managed by a file system on the host 250, objects stored in the public partition 225 (such as the different versions of the content files) may also be protected by the storage device 200. In this embodiment, the various versions of the content are protected by respective content encryption keys 240 stored in the hidden protected system area 235, and those keys 240 are themselves protected by the memory-device unique key stored in the non-volatile memory 217 of the controller 210. Accordingly, to unprotect one of the protected content files, the crypto-engine 214 would use the memory-device unique key stored in the non-volatile memory 217 of the controller 210 to decrypt the appropriate content encryption key 240 and then use the decrypted content encryption key 240 to decrypt the protected content file.

Turning now to the host 250, the host 250 comprises a controller 260 that has a storage device interface 261 for interfacing with the storage device 200. The controller 260 also comprises a central processing unit (CPU) 263, a crypto-engine 264 operative to provide encryption and/or decryption operations, read access memory (RAM) 265, read only memory (ROM) 266, a security module 271, and protected mass storage 272. The storage device 200 and the host 250 communicate with each other via a storage device interface 261 and a host interface 212. For operations that involve the secure transfer of data, it is preferred that the crypto-engines 214, 264 in the storage device 200 and host 250 be used to mutually authenticate each other and provide a key exchange. After mutual authentication is complete, it is preferred that a session key be used to establish a secure channel for communication between the storage device 250 and host 200. As will be discussed in more detail below, the type of session key and other content protection features that are used can vary with the capabilities of the host 200 and the version of the content that is sent to the host 200.

As mentioned above, in these embodiments, the storage device 200 provides a scalable content protection system based on the level of content protection supported by the host 250. This will be illustrated in conjunction with the diagrams of FIGS. 3-5. As shown in these diagrams, the storage device 200 stores a plurality of versions of content; here, three different versions of the same movie (video). Each version of the video is of a different quality (here, high definition (HD), standard definition (SD), and quarter video graphics array (QVGA)) and is associated with a different level of content protection (here, different complexities of cryptography, both in terms of varying AES key strength (AES-256, AES-192, and AES-128) and varying RSA bit strength for authentication). As will be described below, different levels of content protection can take additional or alternate forms, such as, but not limited to, different combinations of security features and digital rights management (DRM) permissions/restrictions.

Storing multiple versions of the same content with varying quality and associated levels of content protection can achieve interoperability across a broad ecosystem, as the same storage device can be used to store content where different levels of security and access control are required from a business perspective. In this way, the storage device 200 is provided with the ability to store and secure content of varying values with matching levels of access control and security, scalable by the storage device 200. This allows the storage device 200 to be a universal content distribution medium to protected content with varying level of access control to be accessed and consumed by hosts with varying capabilities, such as an HD device, a DVD/set-top box, and a mobile device. As will be seen from these examples, the storage device 200 receives information from a host identifying a level of content protection supported by the host and sends the host a version of the content that is associated with that level of content protection, using the level of content protection that is supported by the host.

Figure 3:
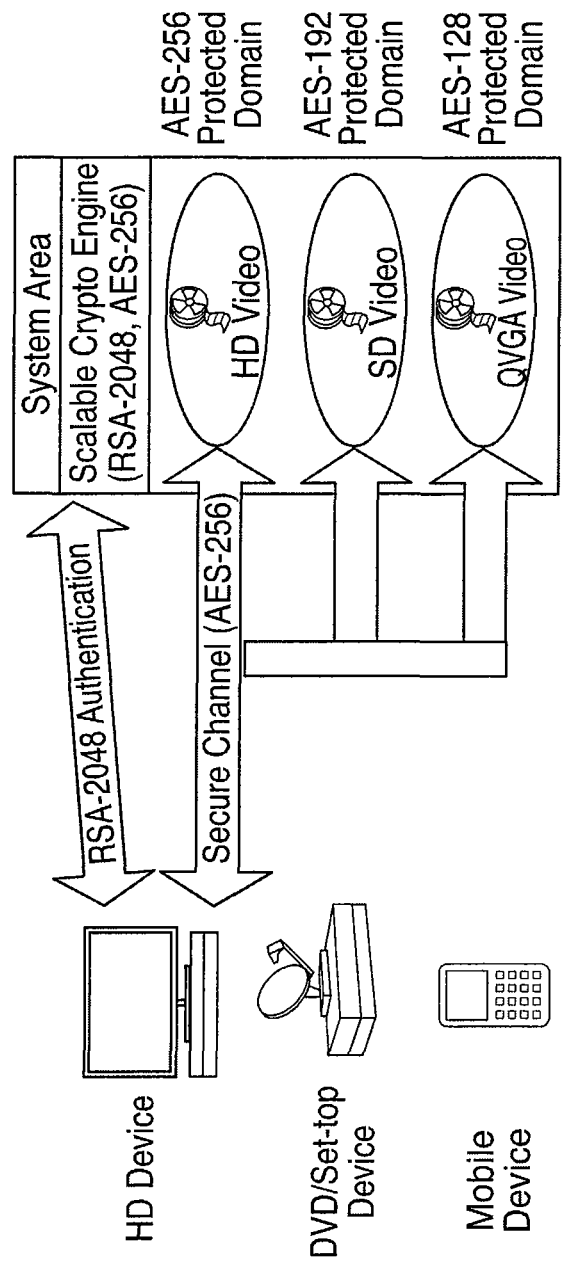
FIGS. 3-5 are diagrams illustrating scalable content protection features of an embodiment.

Turning first to FIG. 3 where the host takes the form of an HD device, the HD device first identifies itself as a HD-capable host to the storage device. In the storage device 200, the controller 210 (executing the firmware 244) scales the security scheme to an "HD level" for the subsequent exchanges with the host 250. In this example, the storage device's crypto-engine can support up to RSA-2048 authentication and AES-256 key strength, which are the content protection levels associated in this example with the HD quality version of the content. The host 250 and storage device 200 proceed to perform mutual authentication via PKI RSA-2048 and establish a secure channel using AES-256. The storage device 200 can also manage access rights to the various other versions of the content stored in the storage device 200. For example, if the host 250 is allowed access to the HD quality version of the content, the storage device 200 can allow the host 250 to access only this version or access to this version and any lower quality versions, as illustrated by the various arrows to the HD video, SD video and QVGA video in FIG. 3.

Figure 4:
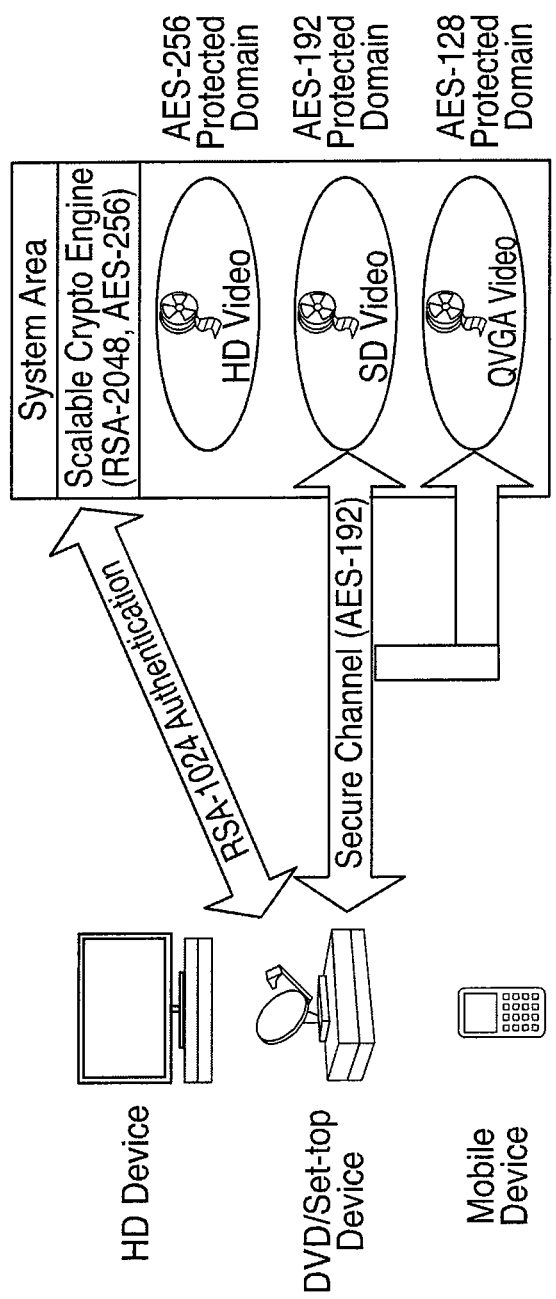

In FIG. 4, the host 250 is DVD/set-top device that does not support as high of a level of content protection. That is, instead of supporting RSA-2048 authentication and AES-256 key strength, the DVD/set-top device only supports RSA-1024 authentication and AES-192 key strength, which are the content protection levels associated in this example with the SD quality version of the content. Accordingly, when the DVD/set-top device identifies itself as a SD-capable host to the storage device 200, the storage device 200 scales its content protection back from RSA-2048 authentication and AES-256 key strength to RSA-1024 authentication and AES-192 key strength, even though it is capable of providing a higher-level of content protection. The DVD/set-top device and storage device 200 proceed to perform mutual authentication via PKI RSA-1024 and establish a secure channel using AES-192 to transfer the SD quality version of the content to the DVD/set-top device. As with the above example, the storage device 200 can also manage access rights to the various other versions of the content stored in the storage device 200. Here, the DVD/set-top device has access to both the SD video and QVGA video.

Figure 5:
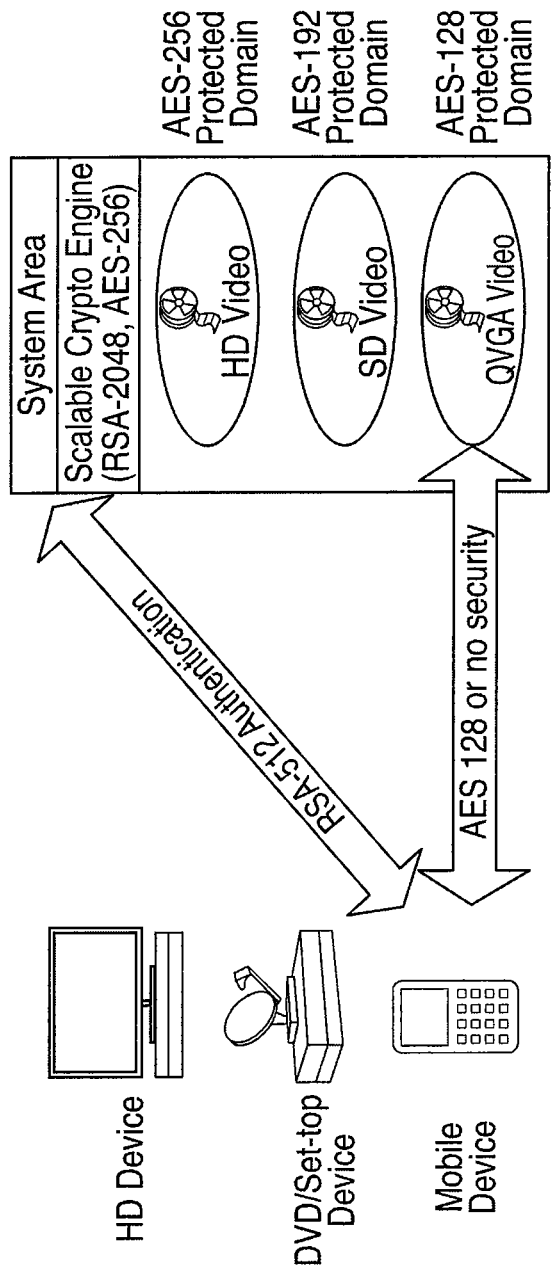

In FIG. 5, the host 250 is a mobile device, which, among these three types of host devices, supports the lowest level of security, if any. In this example, the mobile device only supports RSA-512 authentication and may or may not support AES-128 key strength for secure channel and supports AES-128 key strength for storage encryption, which are the content protection levels associated in this example with the QVGA quality version of the content. When the mobile device identifies itself as a QVGA-capable host to the storage device 200, the storage device 200 scales its content protection back from RSA-2048 authentication and AES-256 key strength to RSA-512 authentication and AES-128 key strength, even though it is capable of providing a higher-level of content protection. The mobile device and storage device 200 proceed to perform mutual authentication via PKI RSA-512 and establish a secure channel using AES-128 to transfer the QVGA quality version of the content to the mobile device. Since the QVGA quality version of the content is the lowest quality version available on the storage device 200, the mobile device can only access this version and none of the others.

There are many advantages associated with these embodiments. For example, these embodiments enable protection and distribution of all content types across a wide ecosystem on a physical media by meeting content protection requirement of content owners without making the solution cost, power, performance, and time-to-market prohibitive for the storage device manufacturers. This overcomes the problems noted above with a non-scalable content protection system, which can delay, limit or prevent the adoption of a storage device as a content vehicle since either the protection level is not sufficient for some content owners or the solution requires hardware modification on the host to support the highest security requirements even for less-valued content.

In the above examples, "content protection" took the form of particular types of authentication (RSA-2048, RSA-1024, and RSA-512) and key strengths (AES-256, AES-192 and AES-128). It should be noted that other types of authentication (e.g., symmetric, asymmetric, user-password based, etc.) and key strengths (e.g., Triple DES, etc.) can be used. It should also be noted that content protections can include other scalable elements in addition to or instead of one or both of authentication and key strength and that these other elements may or may not involve cryptography. Examples of such other scalable elements include, but are not limited to, cipher type, encryption application, rights management, dynamic watermarking, and media partitioning.

Also, in the above examples, the storage device's crypto-engine 214 was used to scale its crypto capability based on the level of content protection supported by the host 250 (e.g., from RSA-2048 to RSA-1024 to RSA-512 and from AES-256 to AES-192 to AES-128). While software can be used to scale the crypto capability of the storage device 200, it is presently preferred that the storage device 200 include a hardware crypto-engine 214 to support this task. (While the hardware crypto-engine 214 is shown in the controller 210 of the storage device 200 in FIG. 2, the hardware crypto-engine 214 can be located elsewhere in the storage device 200.) A hardware crypto-engine 214 is generally more robust than software security methods, which may not be acceptable to protect premium content. Also, a hardware crypto-engine 214 may be better at scaling content protection levels more quickly and with better power efficiency than software, since such scaling is often very computationally intensive. Thus, the use of a hardware crypto-engine 214 can ensure that the scalable content protection mechanisms of these embodiments can be performed without impacting performance and user experience of the storage device 200.

Figure 6:
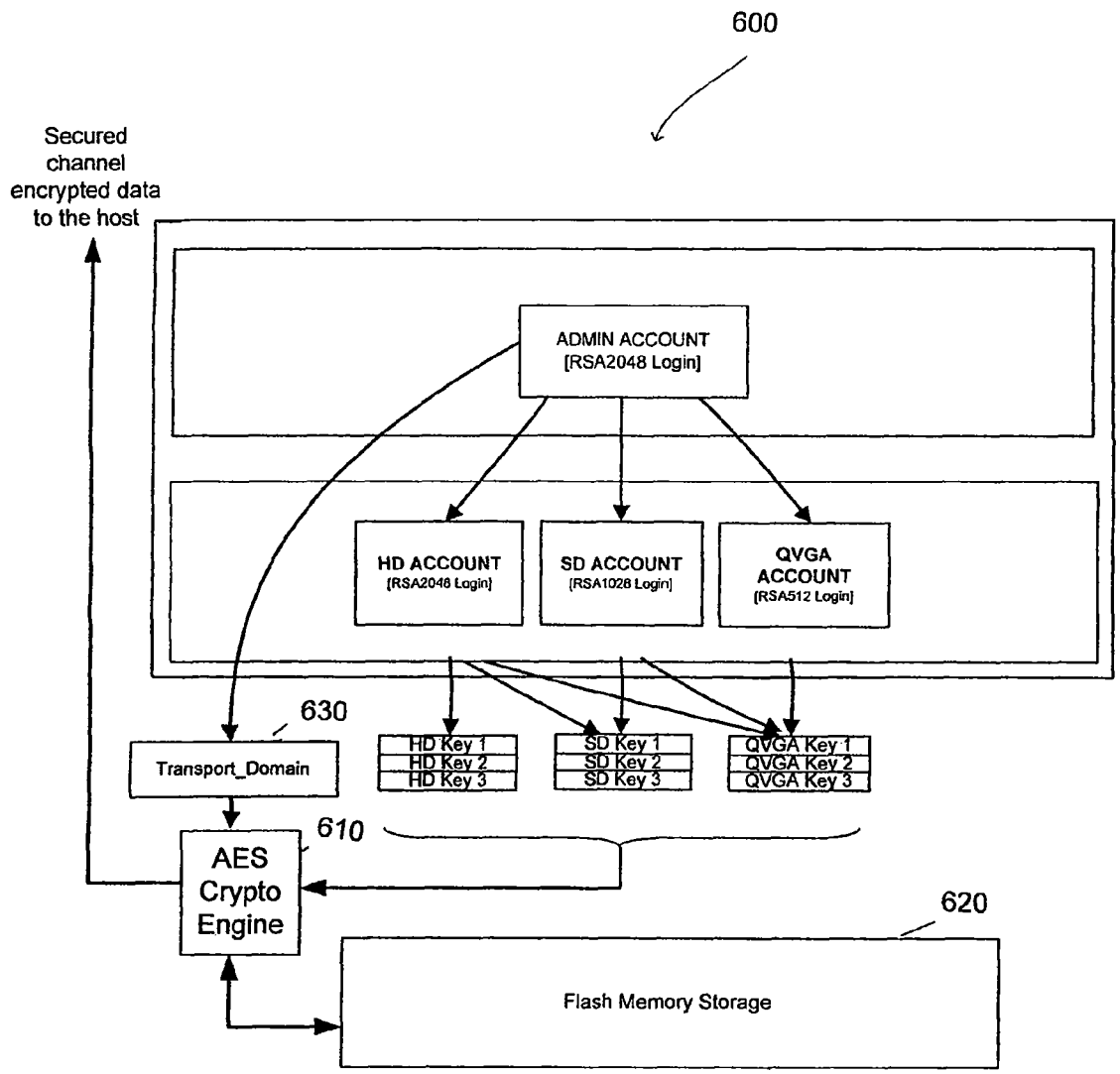
FIG. 6 is a diagram of an exemplary implementation of a scalable content protection system in a storage device of an embodiment.

It should be noted that these embodiments can be implemented in any suitable manner. By way of example only, FIG. 6 is a diagram of an exemplary implementation of a scalable content protection system in a storage device 600 of an embodiment. In this implementation, the storage device 600 stores a plurality of accounts: here, an admin account, an HD account, an SD account, and a QVGA account. The accounts can be stored in a controller of the storage device 600 or in another location. The admin account is the father (or master) account that is created by the manufacture of the storage device 600 (or other administrator) and is used to create the children accounts (i.e., the HD, SD, and QVGA accounts). Each account is associated with a particular authentication mechanism, as shown in FIG. 6. Also, each of the HD, SD, and QVGA accounts have access to respective keys used as input to a hardware AES crypto-engine 610. In the embodiment, a "higher quality" account has access to its own version on the content as well as to lower-quality versions of the content, where the various quality versions are stored in flash memory storage 620. The storage device 600 also contains a transport domain module 630, which is used to decrypt the versions of the content when they are initially loaded onto the storage device.

Figure 7:
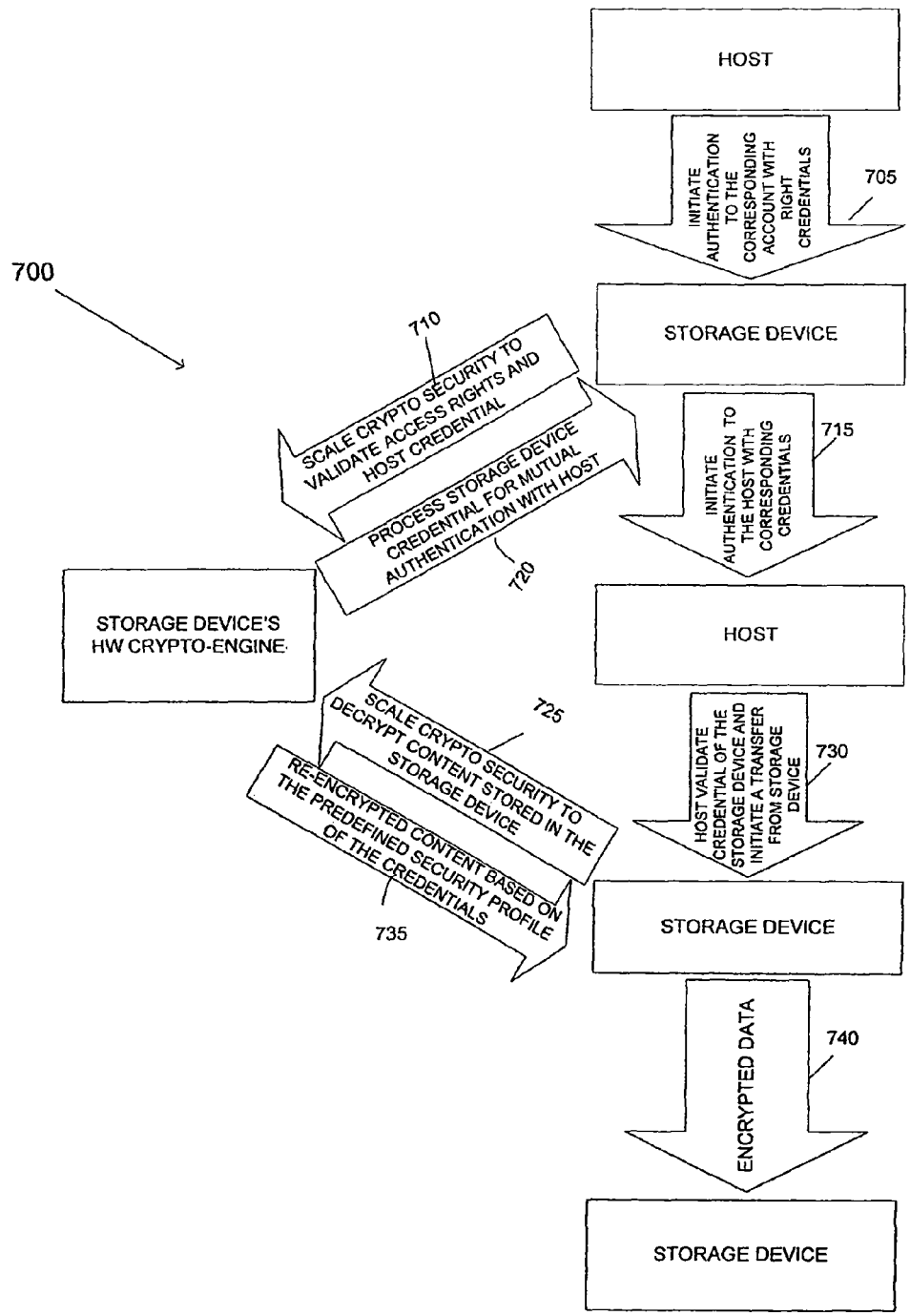
FIG. 7 is a flow chart of a method of an embodiment for providing a scalable content protection system on a storage device.

FIG. 7 is a flow chart 700 illustrating the operation of this embodiment. First, the host initiates authentication to the corresponding account with the right credentials (act 705). So, with reference to the examples in FIGS. 3-5, the HD device would attempt to authenticate to the HD account, the DVD/set-top device would attempt to authenticate to the SD account, and the mobile device would attempt to authenticate to the QVGA account. (The attempt to authenticate to a particular account can be the information that the storage device receives to identify the level of content protection supported by the host.) Next, the storage device configures its hardware crypto-engine to scale the crypto security to validate the access rights and host credentials (act 710). The storage device initiates authentication to the host with corresponding credentials (act 715), with the crypto-engine processing the storage device's credentials for mutual authentication with the host (act 720). The host then validates the credential of the storage device and initiates a transfer of content from the storage device (act 730). The transfer of content can be in response to a request for the content from the host. The storage device then configures its hardware crypto-engine to scale the crypto security to decrypt the content stored on the storage device (act 725), and the crypto-engine provides re-encrypted content based on the predefined security profile specified by the host's credentials (act 735). The encrypted data is then sent to the host over a secure channel (act 740).

Figure 8:
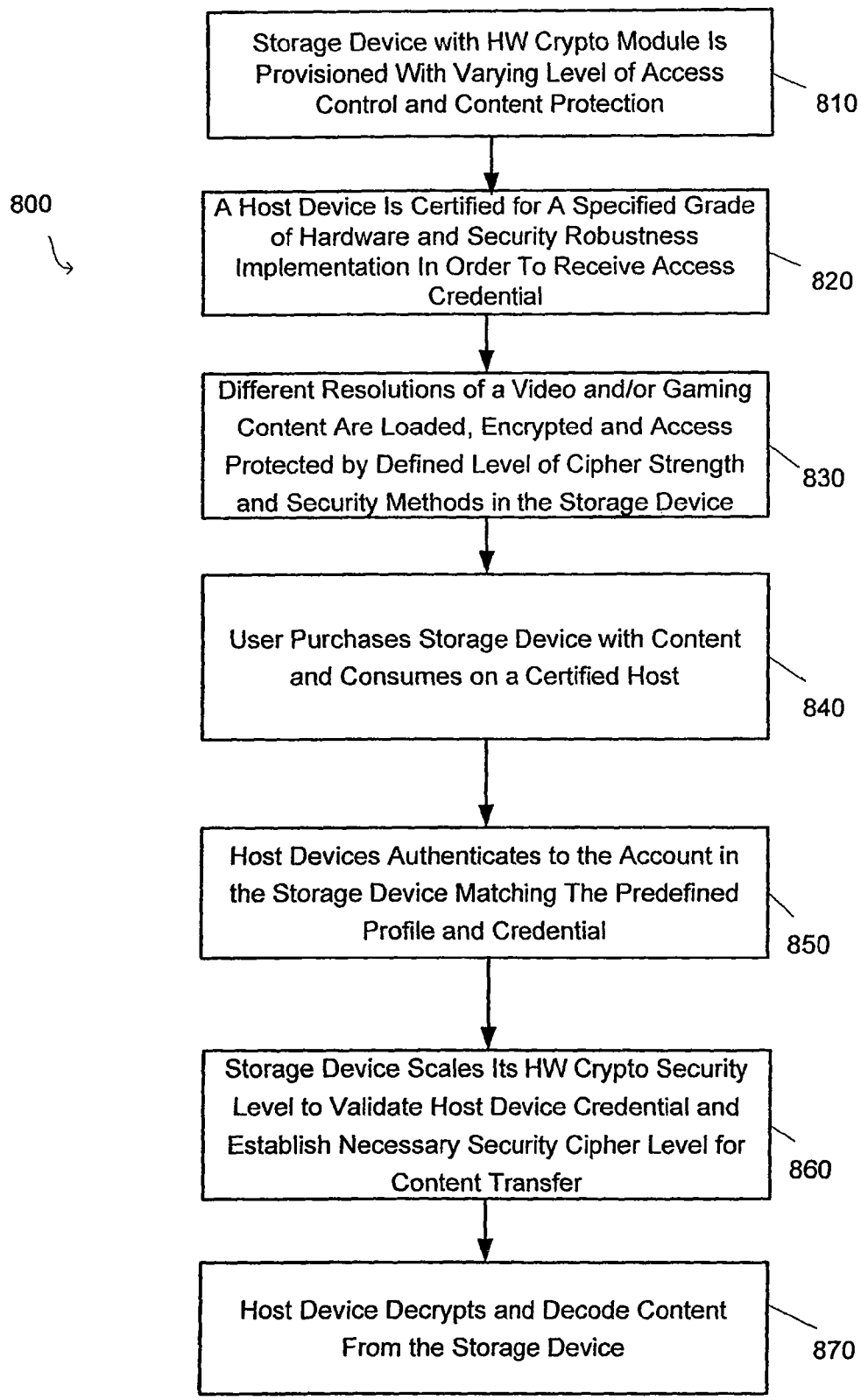
FIG. 8 is a flow chart of a method of an embodiment for providing a scalable content protection system on a storage device.

FIG. 8 is a flow chart 800 that illustrates the overall method used in an ecosystem of an embodiment. As shown in FIG. 8, a storage device is first provisioned with a hardware crypto-module with varying levels of access control and content protection (act 810), and a host device is certified for a specified grade of hardware and security robustness implementation in order to receive access credentials (act 820). Different resolutions of content (e.g., video and/or gaming) are loaded, encrypted, and access protected by the defined level of cipher strength and security methods in the storage device (act 830). A user later purchases the storage device storing the content and attempts to consume the content on a certified host (act 840). The host authenticates to an account in the storage device that matches the predefined profile and credential (act 850). The storage device then scales its hardware crypto security level to validate the host credential and establish the necessary security cipher level for the content transfer (act 860). The host then decrypts and decodes the content from the storage device (act 870).

There are several alternatives that can be used with these embodiments. For example, in the above embodiments, the different levels of content protection applied to different-quality versions of the same content, such as a movie or a game. In addition to this or as an alternate to this, different levels of content protection can apply to different types of content. In this way, different levels of content protection can be applied depending on whether the content is video, audio, a game, or an application, for example. For purposes of access control, one type of content (e.g., video) can be considered a higher quality than another type of content (e.g., audio).

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A storage device comprising:
   a memory operative to store a plurality of versions of content, wherein each version of the content is of a different quality and is associated with a different level of content protection, wherein the plurality of versions of content are encrypted;
   a plurality of accounts, wherein each account provides access to a different version of the content and is associated with a different authentication method and key strength for establishing a secure channel; and
   a controller in communication with the memory, wherein the controller comprises a hardware crypto engine that is operative to vary its crypto capability based on the level of content protection supported by the host, wherein the plurality of accounts have access to respective keys used as input to the hardware crypto engine, and wherein the controller is operative to:
      receive a request from a host to authenticate to one of the plurality of accounts, wherein the account that the host is trying to authenticate to provides an indication to the storage device of the level of content protection supported by the host;
      authenticate the host using an authentication method associated with the account by scaling the hardware crypto engine based on the authentication method;
      generate decrypted content by decrypting encrypted content associated with the account by scaling the hardware crypto engine based on an encrypted level specified in the account;
      re-encrypt the decrypted content using the level of content protection supported by the host by scaling the hardware crypto engine based on an encrypted level supported by the host;
      establish a secure channel with the host using the key strength associated with the account; and
      send, to the host via the established secure channel, the re-encrypted content.

2. The storage device of claim 1, wherein the controller is operative to provide the host with access to only the version of the content that is associated with the level of content protection supported by the host.

3. The storage device of claim 1, wherein the controller is operative to provide the host with access to the version of the content that is associated with the level of content protection supported by the host, as well as to lower-quality versions of the content.

4. A method for providing a scalable content protection system on a storage device, the method comprising:
   performing in a storage device comprising a memory operative to store a plurality of versions of content, wherein the plurality of versions of content are encrypted, wherein each version of the content is of a different quality and is associated with a different level of content protection, and wherein the storage device further comprises a plurality of accounts, wherein each account provides access to a different version of the content and is associated with a different authentication method and key strength for establishing a secure channel, wherein the storage device comprises a hardware crypto engine that is operative to vary its crypto capability based on the level of content protection supported by the host, wherein the plurality of accounts have access to respective keys used as input to the hardware crypto engine:

receiving a request from a host to authenticate to one of the plurality of accounts, wherein the account that the host is trying to authenticate to provides an indication to the storage device of the level of content protection supported by the host;

authenticating the host using an authentication method associated with the account by scaling the hardware crypto engine based on the authentication method;

generating decrypted content by decrypting encrypted content associated with the account by scaling the hardware crypto engine based on an encrypted level specified in the account;

re-encrypting the decrypted content using the level of content protection supported by the host by scaling the hardware crypto engine based on an encrypted level supported by the host;

establishing a secure channel with the host using the key strength associated with the account; and sending, to the host via the established secure channel, the re-encrypted.

5. The method of claim 4, wherein the storage device is operative to provide the host with access to only the version of the content that is associated with the level of content protection supported by the host.

6. The method of claim 4, wherein the storage device is operative to provide the host with access to the version of the content that is associated with the level of content protection supported by the host, as well as to lower-quality versions of the content.

7. A storage device comprising:

a memory operative to store a plurality of different types of content, wherein the plurality of versions of content are encrypted, and wherein each type of content is associated with a different level of content protection;

a plurality of accounts, wherein each account provides access to a type of content and is associated with a different authentication method and key strength for establishing a secure channel; and a controller in communication with the memory, wherein the controller comprises a hardware crypto engine that is operative to vary its crypto capability based on the level of content protection supported by the host and wherein the controller is operative to:

receive a request from a host to authenticate to one of the plurality of accounts, wherein the account that the host is trying to authenticate to provides an indication to the storage device of the level of content protection supported by the host, wherein the plurality of accounts have access to respective keys used as input to the hardware crypto engine;

authenticate the host using an authentication method associated with the account by scaling the hardware crypto engine based on the authentication method;

generate decrypted content by decrypting encrypted content associated with the account by scaling the hardware crypto engine based on an encrypted level specified in the account;

re-encrypt the decrypted content using the level of content protection supported by the host by scaling the hardware crypto engine based on an encrypted level supported by the host;

establish a secure channel with the host using the key strength associated with the account; and send, to the host via the established secure channel, the re-encrypted content.

8. The storage device of claim 7, wherein the controller is operative to provide the host with access to only the type of content that is associated with the level of content protection supported by the host.

9. The storage device of claim 7, wherein the controller is operative to provide the host with access to the type of content that is associated with the level of content protection supported by the host, as well as to lower-quality types of content.

10. A method for providing a scalable content protection system on a storage device, the method comprising:

performing in a storage device comprising a memory operative to store a plurality of types of content, wherein the plurality of versions of content are encrypted, wherein each type of content is associated with a different level of content protection, and wherein the storage device further comprises a plurality of accounts, wherein each account provides access to a different type of the content and is associated with a different authentication method and key strength for establishing a secure channel, wherein the storage device comprises a hardware crypto engine that is operative to vary its crypto capability based on the level of content protection supported by the host, and wherein the plurality of accounts have access to respective keys used as input to the hardware crypto engine:

receiving a request from a host to authenticate to one of the plurality of accounts, wherein the account that the host is trying to authenticate to provides an indication to the storage device of the level of content protection supported by the host;

authenticating the host using an authentication method associated with the account by scaling the hardware crypto engine based on the authentication method;

generating decrypted content by decrypting encrypted content associated with the account by scaling the hardware crypto engine based on an encrypted level specified in the account;

re-encrypting the decrypted content using the level of content protection supported by the host by scaling the hardware crypto engine based on an encrypted level supported by the host;

establishing a secure channel with the host using the key strength associated with the account; and sending, to the host via the established secure channel, the re-encrypted content whose type is associated with the account.

11. The method of claim 10, wherein the storage device is operative to provide the host with access to only the type of content that is associated with the level of content protection supported by the host.

12. The method of claim 10, wherein the storage device is operative to provide the host with access to the type of content that is associated with the level of content protection supported by the host, as well as to lower-quality types of content.

* * * * *